United States Patent
Coimbra De Andrade et al.

(10) Patent No.: US 12,340,594 B2
(45) Date of Patent: Jun. 24, 2025

(54) SYSTEMS AND METHODS FOR DETERMINING ROAD OBJECT IMPORTANCE BASED ON FORWARD FACING AND DRIVER FACING VIDEO DATA

(71) Applicant: Verizon Patent and Licensing Inc., Basking Ridge, NJ (US)

(72) Inventors: Douglas Coimbra De Andrade, Florence (IT); Francesco Sambo, Florence (IT); Matteo Simoncini, Pistoia (IT); Andrea Benericetti, Prato (IT); Leonardo Taccari, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 81 days.

(21) Appl. No.: 18/162,838

(22) Filed: Feb. 1, 2023

(65) Prior Publication Data

US 2024/0257535 A1    Aug. 1, 2024

(51) Int. Cl.
| | |
|---|---|
| *G06V 20/58* | (2022.01) |
| *B60W 50/14* | (2020.01) |
| *G06F 3/01* | (2006.01) |
| *G06T 7/70* | (2017.01) |
| *G06T 17/20* | (2006.01) |
| *G06V 10/74* | (2022.01) |
| *G06V 20/59* | (2022.01) |

(52) U.S. Cl.
CPC .......... *G06V 20/582* (2022.01); *B60W 50/14* (2013.01); *G06F 3/013* (2013.01); *G06T 7/70* (2017.01); *G06T 17/20* (2013.01); *G06V 10/761* (2022.01); *G06V 20/59* (2022.01); *G06T 2207/10048* (2013.01); *G06T 2207/20081* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 10,074,031 | B2* | 9/2018 | Krenzer | G06T 3/60 |
| 10,726,576 | B2* | 7/2020 | Noble | G06T 7/74 |
| 2020/0279279 | A1* | 9/2020 | Chaudhuri | G06N 5/04 |
| 2021/0088811 | A1* | 3/2021 | Varady | G06V 20/653 |
| 2024/0104941 | A1* | 3/2024 | Ren | G06V 20/59 |
| 2024/0404160 | A1* | 12/2024 | Geertsen | G06T 13/40 |

* cited by examiner

*Primary Examiner* — Tyler W. Sullivan

(57) ABSTRACT

A device may receive driver facing video data associated with a driver of a vehicle and forward facing video data associated with the vehicle, and may process the driver facing video data, with a face model, to identify driver head orientation and driver gaze. The device may generate a first transformation matrix mapping the driver facing video data, the driver head orientation, and the driver gaze, and may generate a second transformation matrix mapping the driver facing video data and the forward facing video data. The device may utilize the first transformation matrix and the second transformation matrix to estimate image coordinates, and may aggregate the image coordinates to generate aggregated coordinates. The device may generate heat maps based on the aggregated coordinates, may train machine learning model, with the heat maps, to generate a trained machine learning model, and may perform actions based on the trained machine learning model.

20 Claims, 14 Drawing Sheets

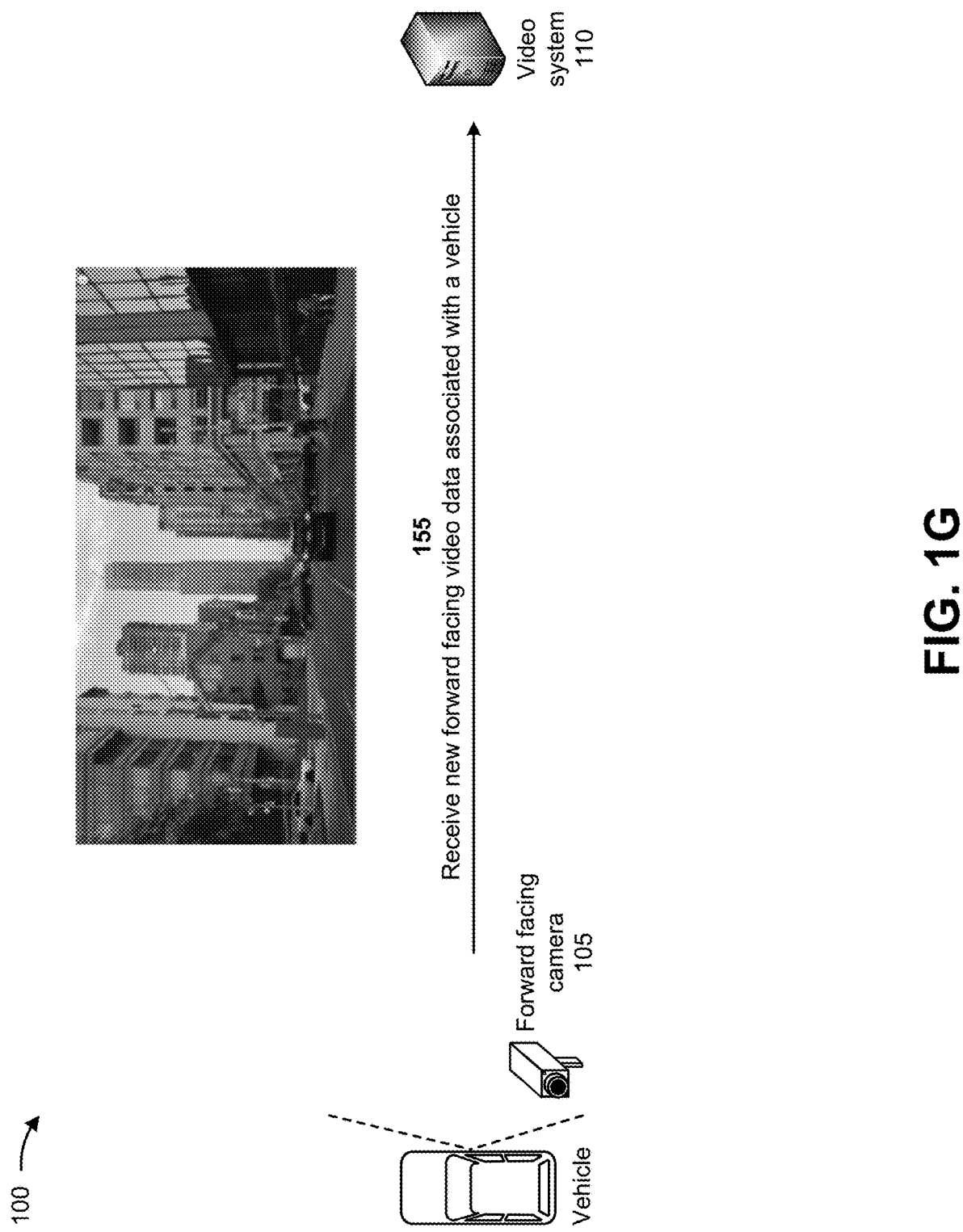

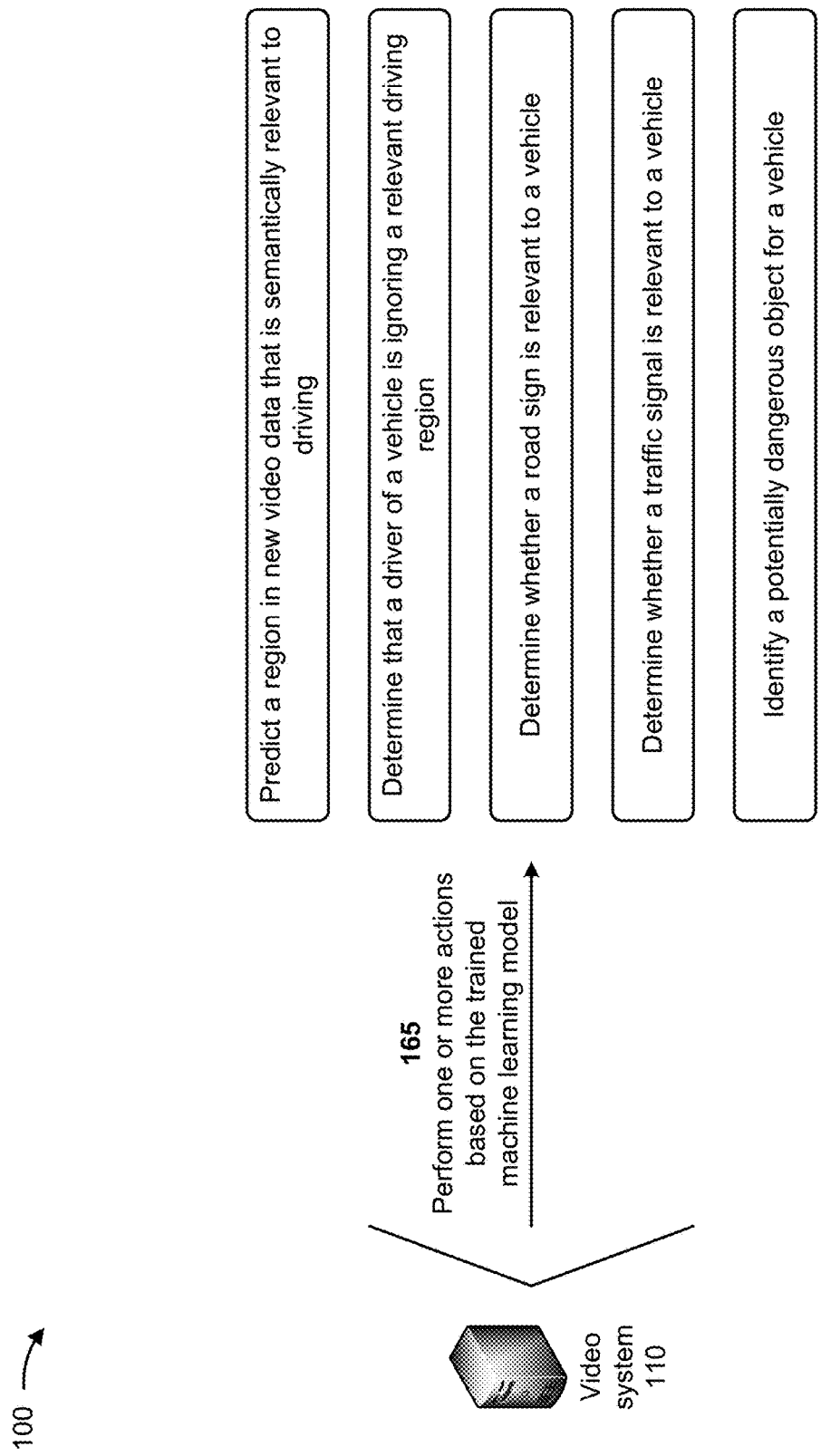

SYSTEMS AND METHODS FOR DETERMINING ROAD OBJECT IMPORTANCE BASED ON FORWARD FACING AND DRIVER FACING VIDEO DATA

BACKGROUND

In many dashcam applications it is necessary to know which road objects visible in video data captured by a forward facing camera of a vehicle are actually relevant for the vehicle. For example, it is not enough to see a traffic signal or a stop sign that may be regulating traffic, but it also must be determined whether the traffic signal or the stop sign is relevant for a vehicle.

BRIEF DESCRIPTION OF THE DRAWINGS

FIGS. 1A-1I are diagrams of an example associated with determining road object importance based on forward facing and driver facing video data.

DETAILED DESCRIPTION OF EXAMPLE EMBODIMENTS

Figure 1A:
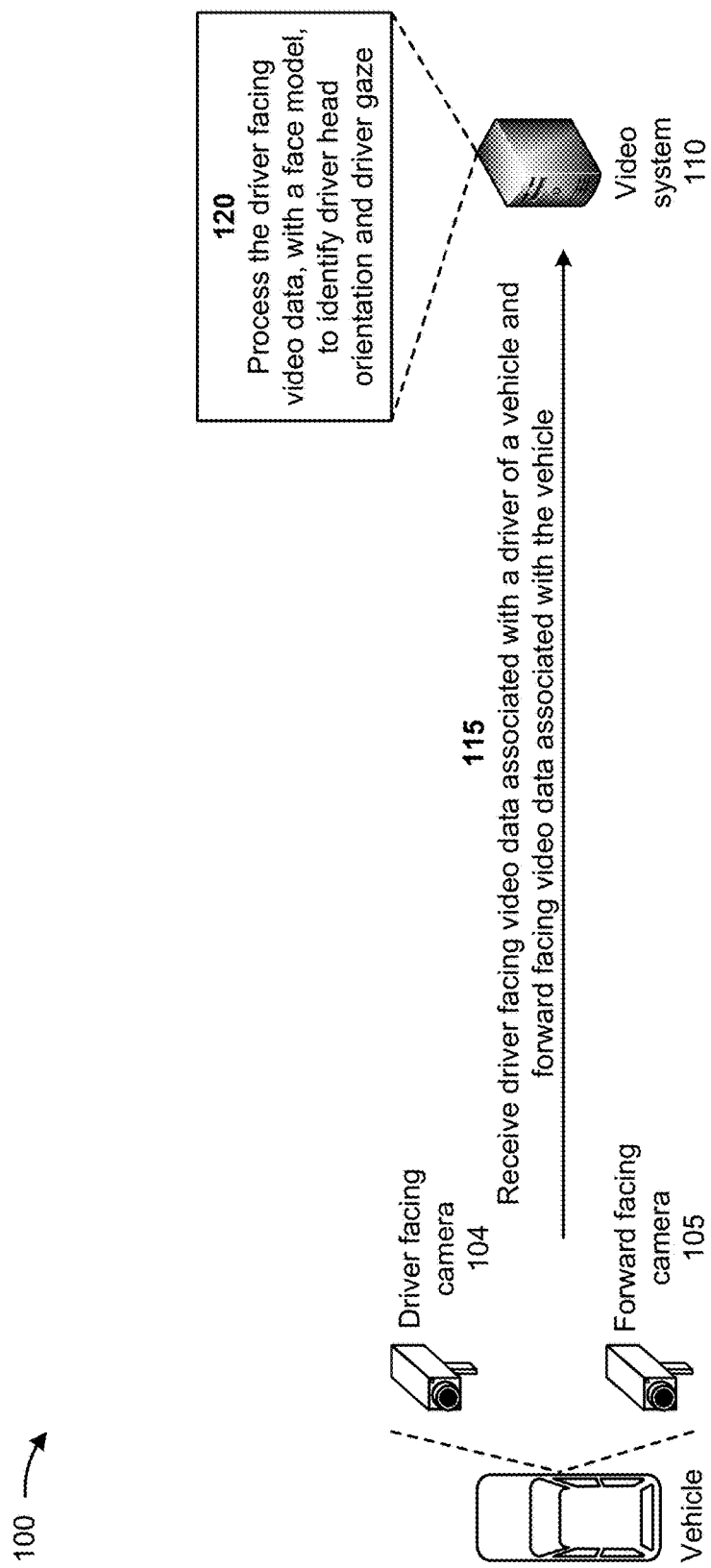

The following detailed description of example implementations refers to the accompanying drawings. The same reference numbers in different drawings may identify the same or similar elements.

Human beings are good at ignoring objects that are not relevant to a given task. In the context of driving, drivers need to pay attention to pedestrians crossing streets, vehicles in their lane, vehicles in other lanes, traffic signs, traffic signals, and/or the like. However, drivers may safely ignore parked cars, buildings, pedestrians on sidewalks, and traffic signals not relevant to their vehicles. Some vehicles may include a forward facing camera (FFC) to record video data associated with what is visible in front of the vehicles and a driver facing camera (DFC) to record video data associated with drivers of the vehicles. Such video data may be collected and stored on a daily basis. However, current techniques require manual labeling of forward facing and driver facing video data to provide a contextual understanding of the video data, and such manual labeling is not viable due to a scale of the video data. Thus, current techniques for utilizing forward facing and driver facing video data to provide a contextual understanding of the video data consume computing resources (e.g., processing resources, memory resources, communication resources, and/or the like), networking resources, and/or other resources associated with attempting and failing to manually label the video data, attempting and failing to train a computer vision model with the unlabeled video data, generating erroneous results with the computer vision model that is improperly trained, and/or the like.

Some implementations described herein provide a video system that determines road object importance based on forward facing and driver facing video data. For example, the video system may receive driver facing video data associated with a driver of a vehicle and forward facing video data associated with the vehicle, and may process the driver facing video data, with a face model, to identify driver head orientation and driver gaze. The forward facing video data and the driver facing video data may be related so that the driver facing video data may train the video system about relevant objects in the forward facing video data, without requiring specific classification models for stop signs, wheels, obstructions, and/or the like. The video system may generate a first transformation matrix mapping the driver facing video data to the driver head orientation and the driver gaze, and may generate a second transformation matrix mapping the driver facing video data and the forward facing video data. The video system may utilize the first transformation matrix and the second transformation matrix to estimate forward facing image coordinates observed by the driver, and may aggregate the forward facing image coordinates to generate aggregated coordinates (e.g., by aggregating head pose or gaze coordinates over a short temporal segment). The video system may generate heat maps based on the aggregated coordinates, and may train a machine learning model, with the heat maps, to generate a trained machine learning model. The video system may perform one or more actions based on the trained machine learning model.

In this way, the video system determines road object importance based on forward facing and driver facing video data. For example, the video system may go beyond simply understanding if a driver is distracted because the driver is not looking at a road. The video system may utilize historical data associated with the driver attention, as captured by driver facing video data, to train a machine learning model to understand semantics of forward facing video data based on learning where the driver attention is focused. Based on the training, current driver facing video can be input to the machine learning model so that the video system may alert the driver that the driver is not looking at an important object, as opposed to simply not looking at the road, and may further understand the semantics of the forward facing video data by identifying which objects are relevant and which objects can safely be ignored. Thus, the video system may conserve computing resources, networking resources, and/or other resources that would have otherwise been consumed by attempting and failing to manually label the video data, attempting and failing to train a computer vision model with the unlabeled video data, generating erroneous results with the computer vision model that is improperly trained, and/or the like.

FIGS. 1A-1I are diagrams of an example 100 associated with determining road object importance based on forward facing and driver facing video data. As shown in FIGS. 1A-1I, example 100 includes, a driver facing camera 104 and a forward facing camera 105 associated with a vehicle and a video system 110. The driver facing camera 104 may capture video data associated with a driver of the vehicle, and the forward facing camera 105 may capture video data associated objects (e.g., pedestrians, traffic signs, traffic signals, road markers, and/or the like) appearing in front of the vehicle. The video system 110 may include a system that determines road object importance based on forward facing and driver facing video data. Further details of the driver facing camera 104, the forward facing camera 105, and the video system 110 are provided elsewhere herein. Although implementations described herein depict a single vehicle, a single driver facing camera 104, and a single forward facing camera 105, in some implementations, the video system 110 may be associated with multiple vehicles, multiple driver facing cameras 105, and multiple forward facing cameras 105. Furthermore, although the video system 110 is described as performing the implementations described herein, one or more other devices (e.g., the driver facing camera 104, the forward facing camera 105, a multi-access edge computing (MEC) device, and/or the like) may perform one or more of the implementations described herein.

As shown in FIG. 1A, and by reference number 115, the video system 110 may receive driver facing video data associated with a driver of a vehicle and forward facing video data associated with the vehicle. For example, the driver facing camera 104 may capture the driver facing video data associated with the driver. The driver facing video data may include video data identifying the driver over a time period associated with operation of the vehicle by the driver. The driver facing camera 104 may continuously provide the driver facing video data to the video system 110 over the time period associated with operation of the vehicle, may periodically provide the driver facing video data to the video system 110 after the time period associated with operation of the vehicle, may provide the driver facing video data to the video system 110 based on receiving a request for the driver facing video data from the video system 110, and/or the like. The video system 110 may receive the driver facing video data from the driver facing camera 104.

The forward facing camera 105 may capture the forward facing video data associated with the vehicle. The forward facing video data may include video data identifying objects appearing in front of the vehicle over the time period associated with operation of the vehicle. The forward facing camera 105 may continuously provide the forward facing video data to the video system 110 over the time period associated with operation of the vehicle, may periodically provide the forward facing video data to the video system 110 after the time period associated with operation of the vehicle, may provide the forward facing video data to the video system 110 based on receiving a request for the forward facing video data from the video system 110, and/or the like. The video system 110 may receive the forward facing video data from the forward facing camera 105.

As further shown in FIG. 1A, and by reference number 120, the video system 110 may process the driver facing video data, with a face model, to identify driver head orientation and driver gaze. For example, the video system 110 may process the driver facing video data with a face model, such as a dual-route model that provides a quantitative account of an influence of head orientation on gaze perception. The face model may identify, the driver head orientation, the driver gaze, and a distance between the driver facing camera 104 and the driver based on the driver facing video data. The video system 110 may associate or map the driver head orientation and the driver gaze with the forward facing video data based on a line segment with an origin in the driver's head and that intercepts an image included in the forward facing video data. The driver head orientation may be defined by head pose angles of the driver, such as a yaw angle (or side to side about a y-axis extending from a top of the driver's head), a pitch angle (or up and down about an x-axis extending between the driver's ears), and/or a roll angle (or twist about a z-axis extending from the driver's nose). From a perspective of the driver facing video data, an origin of the driver gaze may be at the driver's head (e.g., a point between the driver's eyes) and a direction of the driver gaze may be based on the driver head orientation angles (e.g., the yaw, the pitch, and the roll angles).

Figure 1B:
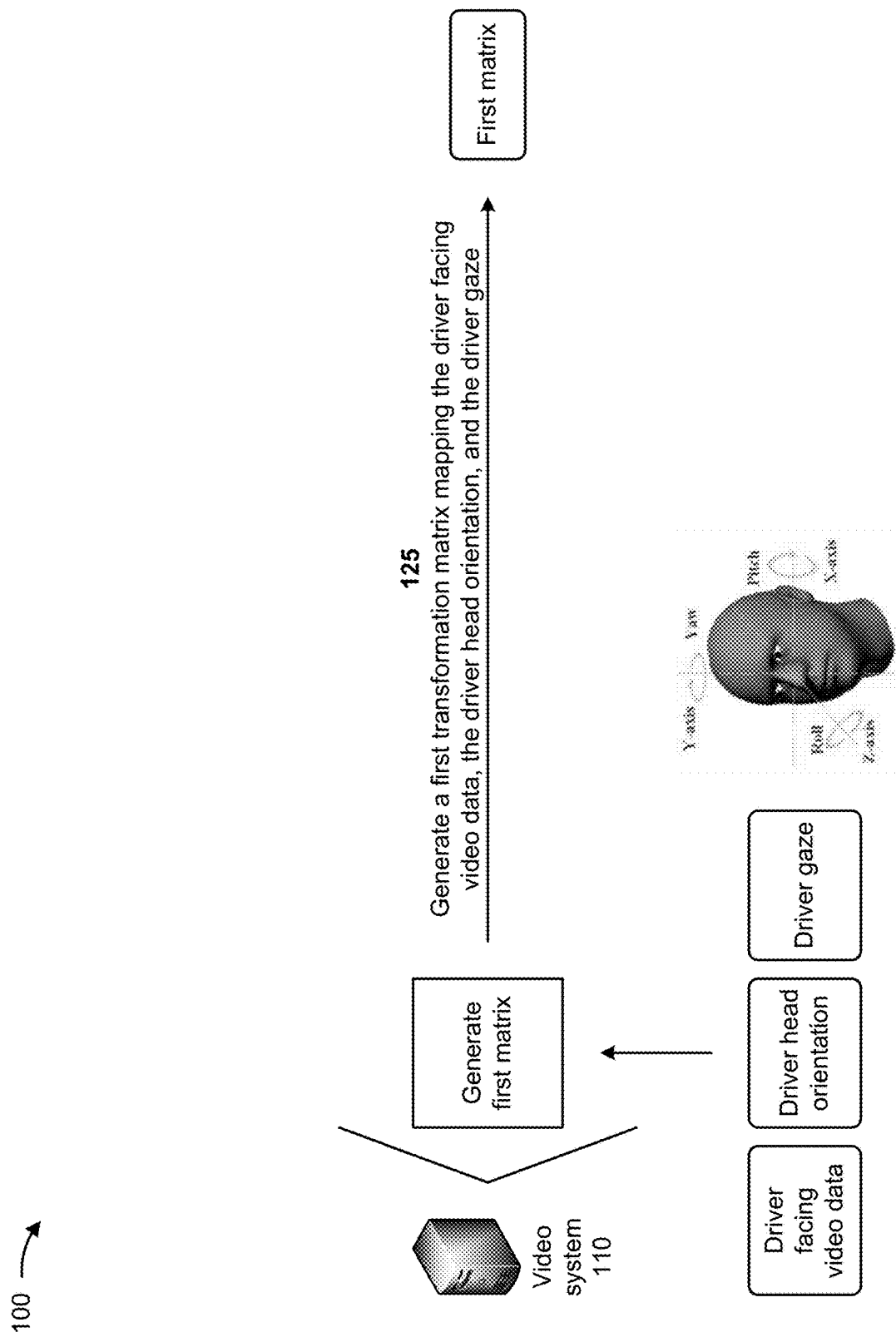

As shown in FIG. 1B, and by reference number 125, the video system 110 may generate a first transformation matrix mapping the driver facing video data, the driver head orientation, and the driver gaze. For example, when generating the first transformation matrix mapping the driver facing video data, the driver head orientation, and the driver gaze, the video system 110 may utilize a direction cosine matrix to generate the first transformation matrix mapping the driver facing video data, the driver head orientation, and the driver gaze. The direction cosine matrix or gaze direction ($GD_{DFC}$) may be calculated based on the driver head orientation ($M_{head \rightarrow DFC}$), the driver gaze ($M_{eye \rightarrow head}$), and a gaze direction vector ($GD_{eye}$), as follows:

$$GD_{DFC} = M_{head \rightarrow DFC} \cdot M_{eye \rightarrow head} \cdot GD_{eye},$$

where $M_{eye \rightarrow head}$ converts the driver gaze from eye coordinates (e.g., a z-axis of the driver's eyes) to head coordinates (e.g., the yaw angle and the pitch angle) and $M_{head \rightarrow DFC}$ converts the driver gaze from head coordinates to DFC coordinates (e.g., the driver facing video data coordinates that include the driver gaze direction and the driver head orientation).

Figure 1C:
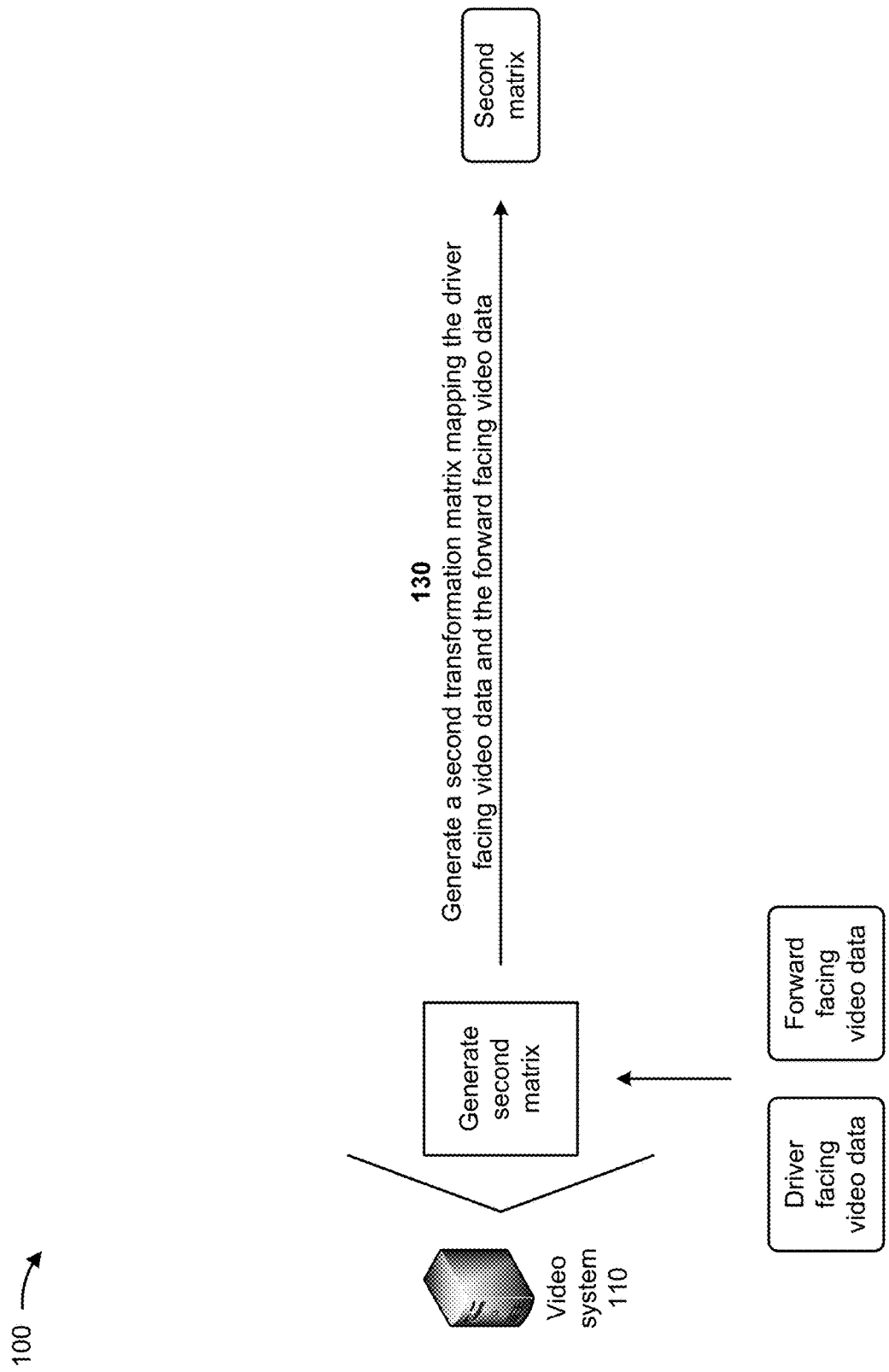

In some implementations, when generating the first transformation matrix mapping the driver facing video data, the driver head orientation, and the driver gaze, the video system 110 may utilize a face mesh model, an eye key points extraction model (e.g., an iris pose estimation), and a perspective-n-points estimation model to generate the first transformation matrix mapping the driver facing video data, the driver head orientation, and the driver gaze. The video system 110 may utilize the face mesh model and the eye key points extraction model, followed by the perspective-n-points estimation model, to generate the first transformation matrix As shown in FIG. 1C, and by reference number 130, the video system 110 may generate a second transformation matrix mapping the driver facing video data and the forward facing video data. For example, when generating the second transformation matrix mapping the driver facing video data and the forward facing video data, the video system 110 may generating the second transformation matrix based on a mechanical construction and direction of the driver facing camera 104 that captures the driver facing video data and based on a mechanical construction and direction of the forward facing camera 105 that captures the forward facing video data. Thus, the second transformation matrix may be based on positions of the lenses of the driver facing camera 104 and the forward facing camera 105. For example, if the lens of the driver facing camera 104 is positioned one-hundred and eighty degrees (180°) relative to the lens of the forward facing camera 105, the second transformation matrix may be based on swapping the signs of the y and z components of the driver facing video data.

If the forward facing camera 105 provides a pitch angle, the video system 110 may apply the pitch angle may independently to the driver facing video data and the forward facing video data when generating the second transformation matrix. In this case, current values of the pitch angles applied to the driver facing video data and the forward facing video data need to be known so that the second transformation matrix can be computed. In a more general case, however, the second transformation matrix may be a function of the mechanical constructions of the driver facing camera 104 and the forward facing camera 105 and the directions of the lenses of the driver facing camera 104 and the forward facing camera 105. If the vehicle includes multiple driver facing cameras 105 and forward facing cameras 105, the video system 110 may apply the same procedure to each driver facing camera 104/forward facing camera 105 pair so that a gaze direction in every image of the forward facing video data can be estimated from whichever image of the driver facing video data includes the driver head orientation and the driver gaze direction.

The video system 110 may calculate the driver gaze as follows:

$$GO_{FFC} + GD_{FFC} = T_{DFC \to FFC} + GO_{DFC} + M_{DFC \to FFC} \cdot M_{head \to DFC} \cdot M_{eye \to head} \cdot GD_{eye},$$

where $GO_{FFC} + GD_{FFC}$ corresponds to the driver gaze, $T_{DFC \to FFC} + GO_{DFC}$ corresponds to the driver facing camera 104 to head translation, and $M_{DFC \to FFC}$ corresponds to a mechanical design of the driver facing camera 104. If there are unknown parameters in the mechanical designs of the driver facing camera 104 and the forward facing camera 105 (e.g., the angles of the lenses are not known), the gaze direction can still be estimated by processing the driver facing video data for a time period (e.g., thirty second, sixty seconds, and/or the like) and assuming that the most common direction the driver is looking corresponds to a left side of the forward facing video data or the vehicle ahead (e.g., assuming attentive driving).

Other possible ways to estimate the second transformation matrix may include assuming a self-calibration step if a road scene is empty (e.g., as detected by an object detector) to determine what driver head orientation and driver gaze combination corresponds to a "neutral" gaze (e.g., looking straight to the horizon); assuming that the driver will look towards the horizon on a straight empty road, computing statistics using the driver direction over a long period of time to estimate a gaze region that corresponds to the road, and aggregating statistics of gaze direction across drivers to compute a mean average gaze region; calibrating a gaze pattern to create a data set of driver gaze and utilizing statistical analysis to compute a probable gaze region; utilizing a physical target that the driver has to look at, while reporting where they are looking, to directly estimate gaze direction vectors and the second transformation matrix; utilizing semantic information (e.g., known objects as identified by a model) to estimate and correct for camera distortion; and/or the like.

Figure 1D:
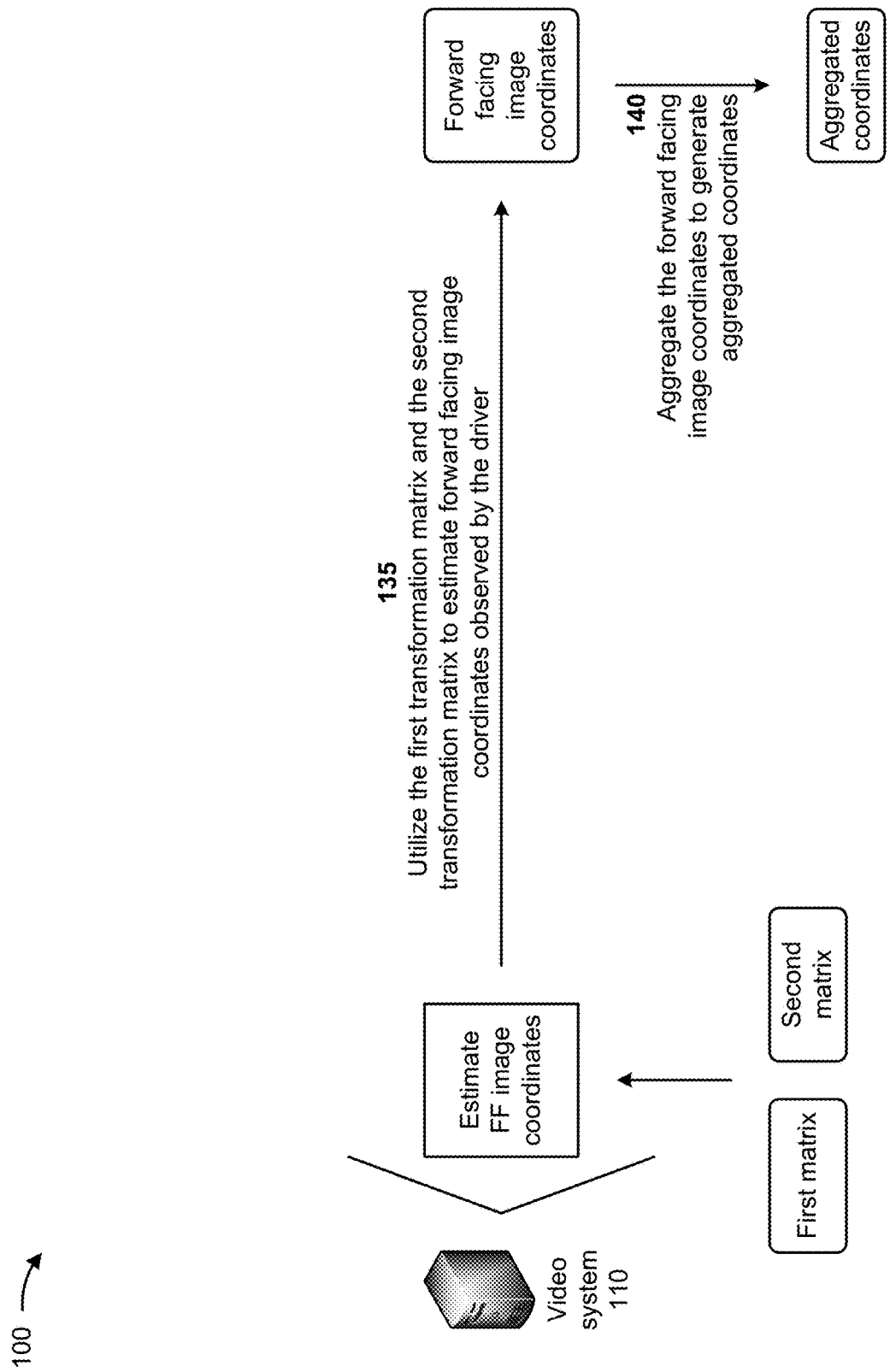

As shown in FIG. 1D, and by reference number 135, the video system 110 may utilize the first transformation matrix and the second transformation matrix to estimate forward facing image coordinates observed by the driver. For example, the video system 110 may utilize the first transformation matrix and the second transformation matrix to estimate image gaze points in the forward facing video data (e.g., the forward facing image coordinates observed by the driver). In view of how difficult it may be to estimate the second transformation matrix and shortcomings of the forward facing camera 105 (e.g., radial distortion), the video system 110 may estimate the image gaze points directly from the driver head orientation and the driver gaze.

In some implementations, the video system 110 may utilize a statistical approach to estimate forward facing image coordinates observed by the driver. A statistical approach may have the advantage of not requiring any form of calibration other than multiple videos from the same driver. The statistical approach (e.g., where percentages and parameter values are provided as examples) may include receiving multiple videos from the same driver and camera position, and identifying the driver head orientation that corresponds to looking ahead (e.g., as a median of the driver head orientation and the driver gaze) and a point in the forward facing video data that corresponds to a vanishing point, which may be computed based on horizon detection (e.g., in a vertical direction) at a horizontal center of an image, or based on an optical flow and a voting scheme. The statistical approach may assume that the driver is looking at a point that appears in the forward facing video data image 95% of the time, and may infer driver head orientation/ driver gaze angle deviations that correspond to looking in a region that is contained within the forward facing video data.

In some implementations, the video system 110 may utilize a calibration approach to estimate forward facing image coordinates observed by the driver. The calibration approach may be utilized to determine how driver head orientation/driver gaze variations correspond to a gaze point change in the forward facing video data. The calibration approach may include having the driver look horizontally (e.g., the driver looks straight and then to objects manually positioned at horizontal edges of an image) and vertically (e.g., the driver looks straight and then to objects manually positioned at the corners of the image and/or around the image).

In some implementations, the video system 110 may utilize extra information to determine the driver head orientation and driver gaze range from domain knowledge. In general, given a maneuver, it is possible to determine behaviors of vehicle sensors (e.g., an inertial measurement unit (IMU), a global positioning system (GPS) sensor, and/or the like) and the driver gaze. For example, if the driver turned ninety degrees to the left, an integral of a z-axis gyroscope may add to ninety degrees in a small amount of time and a magnetometer direction (in a GPS sensor) may switch ninety degrees. This extra information may be utilized to identify that the turn happened. It is then possible to go back in time (e.g., a moment of a video before the beginning of the left turn) and assume that the driver looked left and looked at the left rear view mirror. If the driver changed lanes to the right, a vehicle wheel sensor may report a slight turn and that a turn signal was activated to indicate that intention. In this case, it may be assumed that the driver would look into the right rear view mirror and associate that driver head orientation and driver gaze combination with a rightmost part of a forward facing image. In some cases, if the vehicle stops and object detection determines that a traffic light exists only in an upper part of the image (e.g., no traffic lights to the sides), it may be assumed that the driver stopped because of the traffic light. In this case, it may be reasonable to assume that, at some point, the driver would need to look up to determine that the traffic signal turned green. This information may be utilized to determine a combination of driver head orientation and driver gaze that corresponds to looking at the sky (e.g., a region in the forward facing image that is above the horizon line).

As further shown in FIG. 1D, and by reference number 140, the video system 110 may aggregate the forward facing image coordinates to generate aggregated coordinates. For example, the video system 110 may aggregate the forward facing image coordinates, to generate the aggregated coordinates (e.g., coordinates associated with the driver gaze) over a time period around a current image frame (e.g., typical values around two-hundred milliseconds to on-thousand milliseconds) to correctly capture the driver gaze. The aggregated coordinates may be associated with causal events (e.g., and include only past image frames) or non-causal events (e.g., and include image frames before and after a current image frame).

Figure 1E:
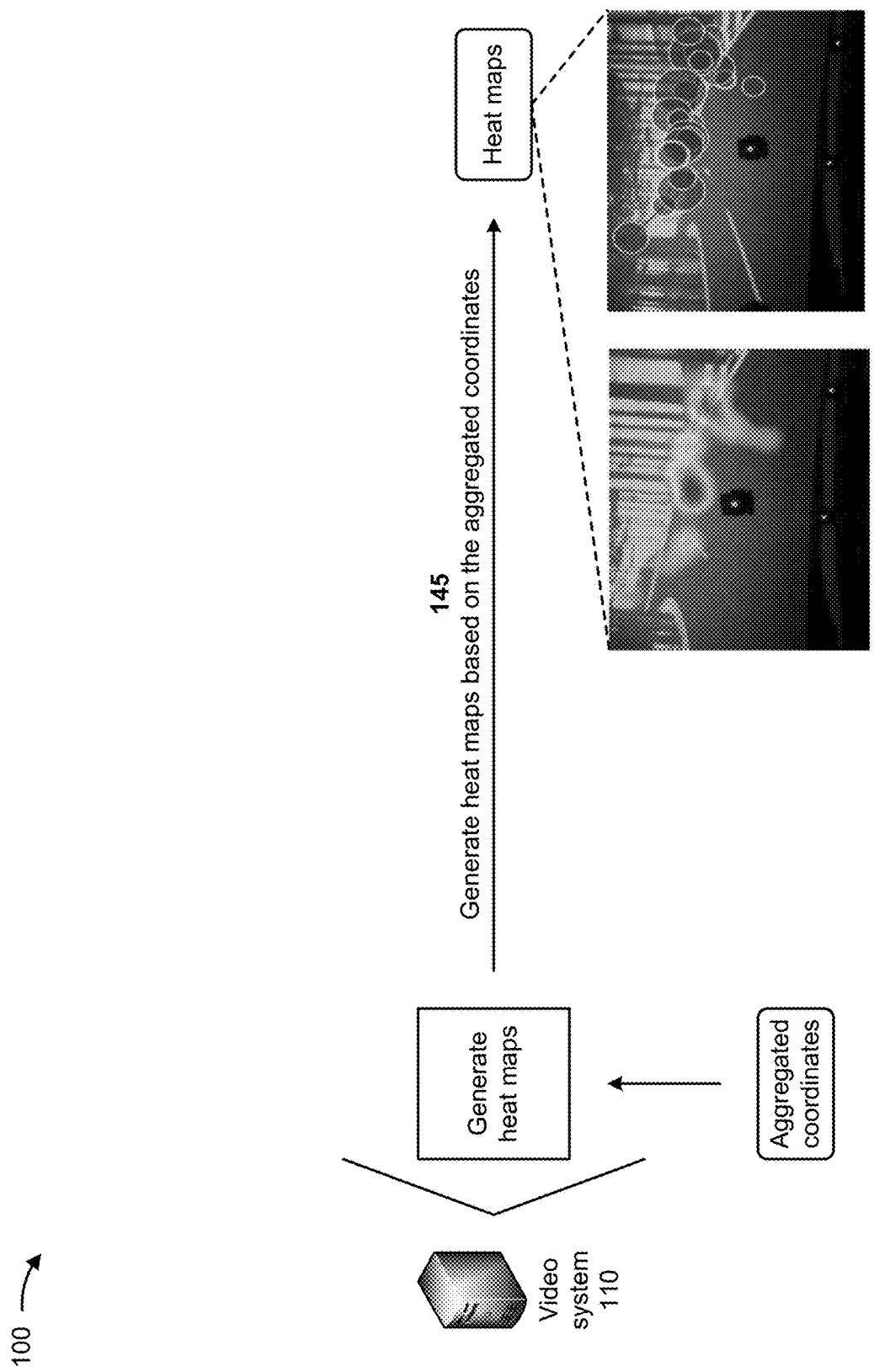

As shown in FIG. 1E, and by reference number 145, the video system 110 may generate heat maps based on the aggregated coordinates. For example, when generating the heat maps based on the aggregated coordinates, the video system 110 may determine gaze time periods associated with the forward facing image coordinates observed by the driver and provided in the aggregated coordinates. The video system 110 may then generate the heat maps based on the gaze time periods and the aggregated coordinates. In some implementations, the video system 110 may generate a set of forward facing videos with heat maps or pseudo labels indicating objects observed by the driver and lengths of time that the driver observes the objects. The heat maps may be utilized as input for training a machine learning model (e.g., a deep learning model), but there may be parameters that need to be calibrated during the generation of the heat maps. In some implementations, a heat map may be sized differently, colored differently, shaped differently, and/or the like depending on the lengths of time that the driver observes the objects.

Figure 1F:
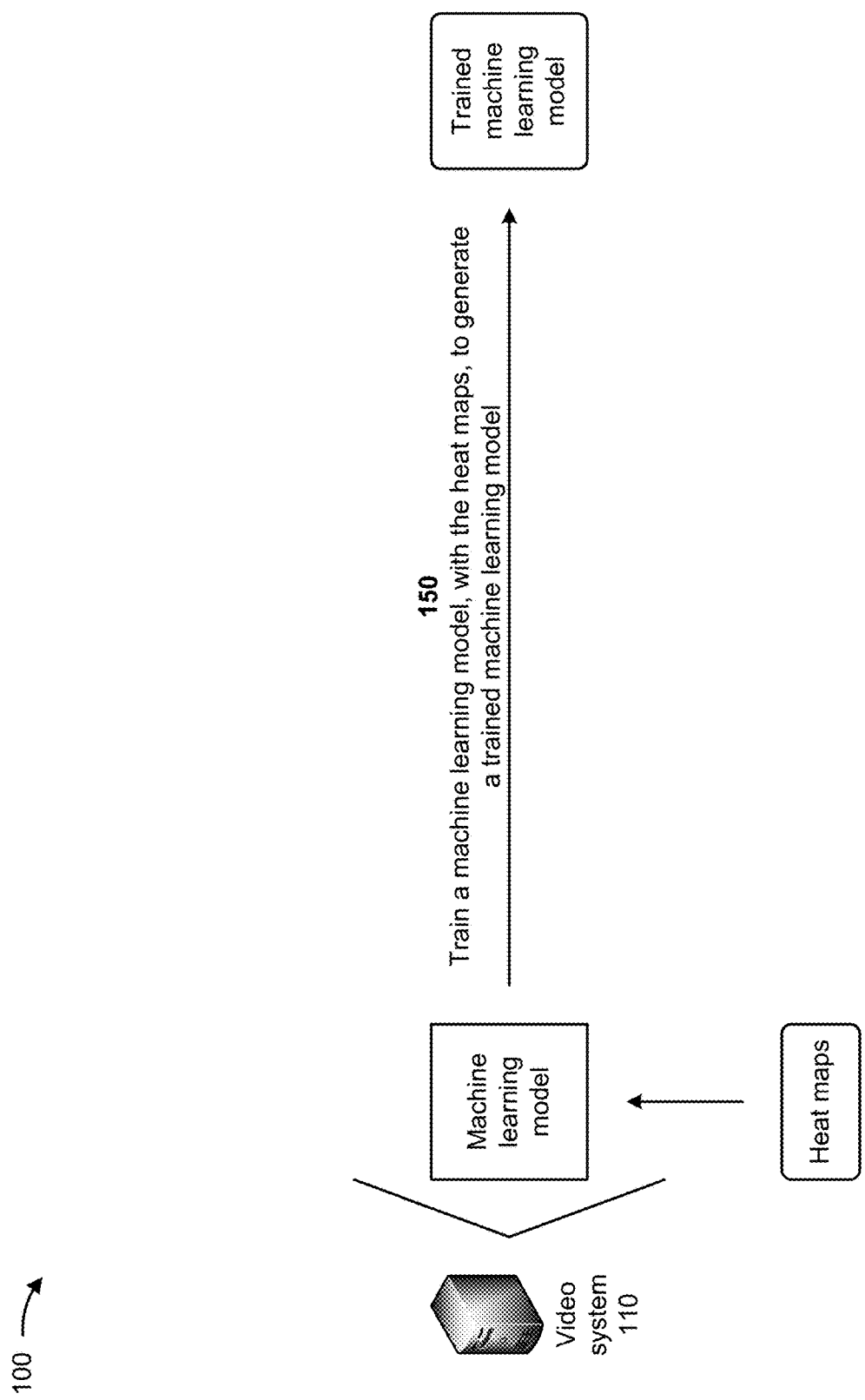

As shown in FIG. 1F, and by reference number 150, the video system 110 may train a machine learning model, with the heat maps, to generate a trained machine learning model. For example, the video system 110 may be associated with one or more machine learning models, such as one or more deep learning models. The video system 110 may utilize the heat maps to train the machine learning model and to generate the trained machine learning model. The trained machine learning model may estimate driver heat maps based on front facing video data and/or driver facing video data. In some implementations, the video system 110 may receive, from the vehicle, vehicle data identifying one or more of infrared images associated with the vehicle, multispectral images associated with the vehicle, a speed of the vehicle, a wheel turn angle of the vehicle, a turn signal of the vehicle, brake and thrust pedal levels of the vehicle, an acceleration of the vehicle, and/or the like. In some implementations, the video system 110 may train the machine learning model, with the heat maps and the vehicle data, to generate the trained machine learning model.

In some implementations, the video system 110 may utilize a frame of a driving scene and a heat map of an eye gaze of a driver, with other deep learning models, to solve specific tasks or to be used as part of a training procedure that produces a model capable of predicting important regions in forward facing images (e.g., regions in the images that are semantically relevant to the task of driving). The video system 110 may combine the frame and the heat map by utilizing the heat map to identify objects in a scene, measuring an intersection between the heat map and an output of an object detector or of an instance segmentation model.

In some implementations, for each object detected, the video system 110 may compute a time period that the driver gazed on the object as a weighted sum. For example, an input image may include objects (k) and elements ($m_{ij}^k$) that are binary variables of one (1) if a pixel (ij) belongs to an object (k) or zero (0) otherwise. A heat map may include elements ($h_{ij}^k$) with values between zero (0) and one (1). The video system 110 may compute a quantity amount of gaze ($G_k$) on each object as:

$$G_k = \sum_{ij} m_{ij}^k h_{ij}^k,$$

where a weighted sum of all the gazes fall within the pixels of an object.

In some implementations, the video system 110 may utilize a gaze heat map, in an end-to-end manner, as an additional source of information to solve a specific task. For example, the video system 110 may utilize the gaze map for event severity categorization (e.g., assessing a severity of a video recorded by a dashcam, distinguishing between minor, moderate, major, and critical). The information from the gaze heat map may be used to improve an overall classification performance (e.g., a harsh brake behind a car could be a moderate event, but if the driver was not looking at the vehicle until the very last moment, it could become a major event).

In such implementations, an input of a neural network model (e.g., a convolutional neural network (CNN) model) may include an H×W×4 matrix, where H and W are a width and a height of an image, three channels associated with red, green, and blue components of the image (e.g., normalized between zero and one), and a fourth channel associated with the gaze heat map (e.g., normalized between zero and one). In order to be able to receive a 4-channel image as input, a first convolutional operation of the CNN model may be adjusted. A learnable weight of a convolutional layer is a tensor of shape n×h×w×m, where n is the number of input channels, h and w are the size of the convolutional filters, and m is a quantity of filters applied (and the number of output channels). In a typical setup, the first convolutional layer may include a set of 3×3 filters, for instance with m=64, receiving a RGB (3-channel) image as input, thus its weight tensor has shape 3×3×3×64. To receive a 4-channel image, the tensor of the first convolutional layer may be modified to 4×3×3×64. In some cases, original weights for the first three channels (e.g., obtained by an original training of the network or from a pre-training) may be preserved, while generating weights for the fourth 1×3×3×64 channel by averaging the weights for first three channels, as a starting point for the training.

In some implementations, if gaze information is lost in the first stages of the CNN model, the video system 110 may apply a channel expansion technique to all the convolutional layers of the CNN model. In order to do so, the heat map may be down sampled to match a size of the tensors at each stage. Conceptually, in this setup, the CNN model may learn to use the gaze information when needed. For instance, returning to the severity classification example, the CNN model may ignore the gaze information (e.g., by assigning a close to zero weight to the heat map channel) in the early stages, when the CNN model is focused at recognizing objects in a road scene, and utilize the gaze information (e.g., by assigning a larger weight to the heat map channel) in the later stages when the CNN model adjusts a level of danger. In other examples, the CNN model may utilize the gaze information in the early stages, in other stages, and/or the like. In some implementations, the machine learning model may be extended to video processing by adding an extra dimension (e.g., time) to the input data.

If the driver facing video data is unavailable, the video system 110 may train the machine learning model, with data indicating that the driver is likely to look at important objects and a matrix mapping driver attention to forward facing video data, to generate a trained machine learning model that generates an importance map for objects based on the forward facing video data. In some implementations, the video system may utilize an externally trained object detector and/or segmenter (e.g., a faster region based (R)-CNN model, a you only look once (YOLO) model, a mask R-CNN, and/or the like), may directly utilize the driver's focus map (e.g., regions where the driver gaze focused three-hundred milliseconds or one second before a frame). The input to the machine learning model may include frames and attention maps that came before a current frame (e.g., the machine learning model is used in a causal mode) or data from future frames (e.g., if a video is being analyzed a posteriori).

As shown in FIG. 1G, and by reference number 155, the video system 110 may receive new forward facing video data associated with a vehicle. For example, another vehicle with another forward facing camera 105 may be associated with the video system 110. The other forward facing camera 105 may capture the new forward facing video data associated with the other vehicle. The new forward facing video data may include video data identifying objects appearing in front of the other vehicle over a time period associated with operation of the other vehicle. The other forward facing camera 105 may continuously provide the new forward facing video data to the video system 110 over the time period associated with operation of the other vehicle, may periodically provide the new forward facing video data to the video system 110 after the time period associated with operation of the other vehicle, may provide the new forward facing video data to the video system 110 based on receiving a request for the new forward facing video data from the video system 110, and/or the like. The video system 110 may receive the new forward facing video data from the other forward facing camera 105.

Figure 1H:
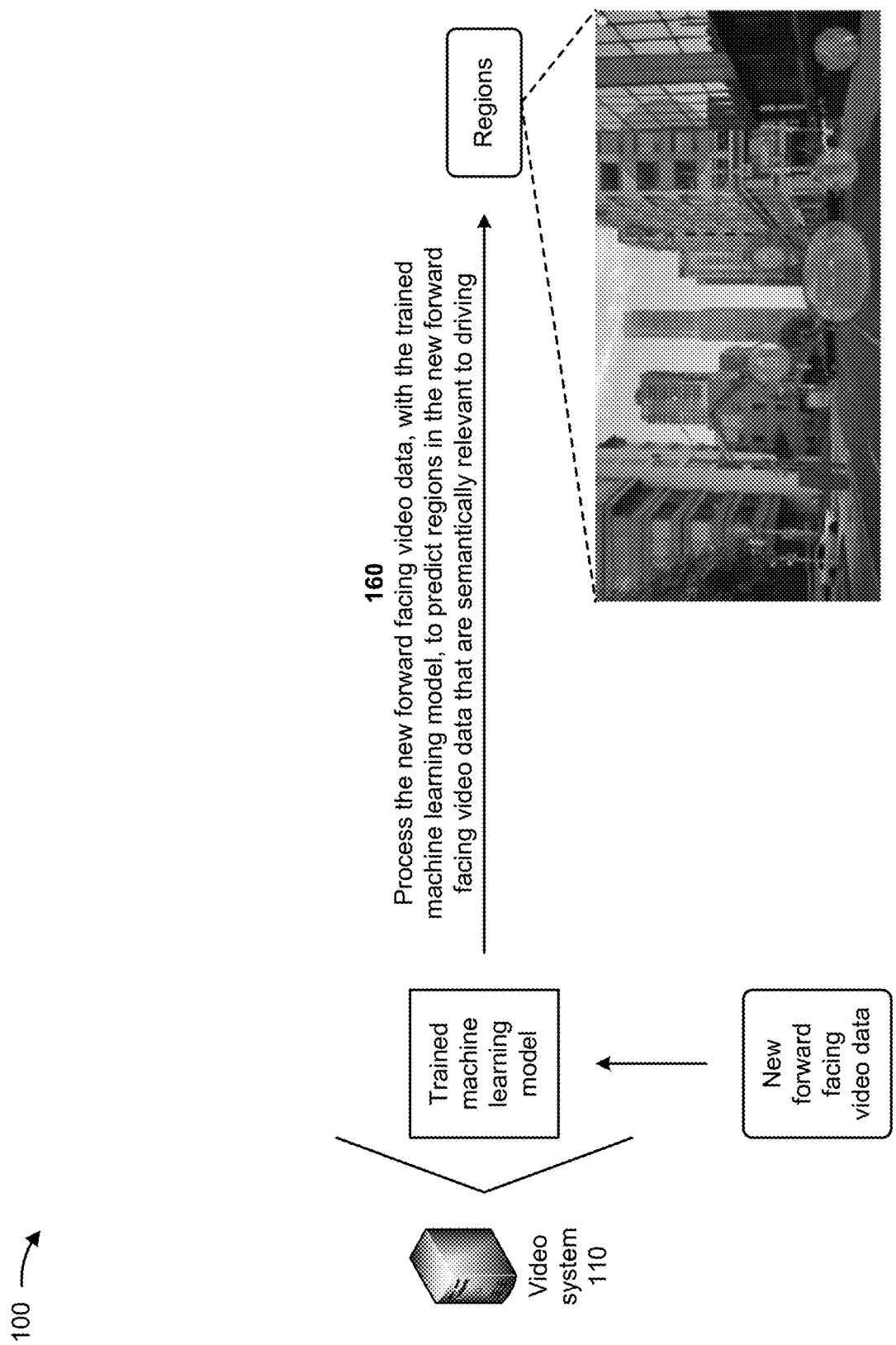

As shown in FIG. 1H, and by reference number 160, the video system 110 may process the new forward facing video data, with the trained machine learning model, to predict regions in the new forward facing video data that are semantically relevant to driving. For example, the video system 110 may process the new forward facing video data, with the trained machine learning model, to identify regions in the new forward facing video data that are important (e.g., semantically relevant) to driving the other vehicle. The video system 110 may discard image regions that have low importance to driving the other vehicle. The trained machine learning model may utilize the predicted regions to trigger in-vehicle alerts to the driver.

As shown in FIG. 1I, and by reference number 165, the video system 110 may perform one or more actions based on the trained machine learning model. In some implementations, when performing the one or more actions, the video system 110 may predict a region in new video data that is semantically relevant to driving. For example, the video system 110 may process new video data with the trained model to predict a region (e.g., an object, such as a traffic signal) in the new video data that is semantically relevant to driving. The video system 110 may provide information identifying the predicted region to the vehicle, and the vehicle may inform the driver of the predicted region. In this way, the video system 110 conserves computing resources, networking resources, and/or other resources that would have otherwise been consumed by generating erroneous results with a computer vision model that is improperly trained.

In some implementations, when performing the one or more actions, the video system 110 may determine that a driver of a vehicle is ignoring a relevant driving region. For example, the video system 110 may utilize the trained machine learning model to determine that the driver is ignoring a relevant driving region (e.g., a stop sign, a traffic signal, and/or the like) and to predict that a violation or an accident may occur. The driver may seem attentive but may be distracted and not see the relevant driving region. The video system 110 may cause an in-vehicle warning to be provided to the driver to prevent a collision in those circumstances. In this way, the video system 110 conserves computing resources, networking resources, and/or other resources that would have otherwise been consumed by handling a traffic accident, dispatching emergency services, handling legal issues, and/or the like.

In some implementations, when performing the one or more actions, the video system 110 may determine whether a road sign is relevant to a vehicle. For example, the video system 110 may utilize the trained machine learning model to determine whether a road sign is relevant to the vehicle. The mere presence of a road stop sign is not enough to establish that the road sign is relevant to the vehicle. A trajectory of the vehicle may determine whether the road sign is relevant to the vehicle. For example, a first trajectory (e.g., traveling straight) may render the road sign irrelevant to the vehicle, whereas a second trajectory (e.g., making a turn) may render the road sign relevant to the vehicle. In this way, the video system 110 conserves computing resources, networking resources, and/or other resources that would have otherwise been consumed by handling a traffic accident, dispatching emergency services, handling legal issues, and/or the like.

In some implementations, when performing the one or more actions, the video system 110 may determine whether a traffic signal is relevant to a vehicle. For example, the video system 110 may utilize the trained machine learning model to determine whether a traffic signal is relevant to a vehicle. In some scenarios, it is insufficient to use an object detector to locate traffic lights and potentially identify their status (e.g., red, yellow, or green). For example, traffic lights for pedestrians and vehicles in other lanes may be irrelevant for the vehicle, whereas other traffic lights may be relevant for the vehicle. In this way, the video system 110 conserves computing resources, networking resources, and/or other resources that would have otherwise been consumed by handling a traffic accident, dispatching emergency services, handling legal issues, and/or the like.

In some implementations, when performing the one or more actions, the video system 110 may identify a potentially dangerous object for a vehicle. For example, the video system 110 may utilize the trained machine learning model to identify a potentially dangerous object for a vehicle. The forward facing video data may capture multiple relevant and irrelevant objects. Object detectors, however, can only detect a fraction of possible classes of objects. When the video system 110 identifies a potentially dangerous object for the vehicle, the video system 110 may provide, to the driver, an in-vehicle alert indicating that a relevant, unidentified object is present in the scene. In this way, the video system 110 conserves computing resources, networking resources, and/or other resources that would have otherwise been consumed by handling a traffic accident, dispatching emergency services, handling insurance issues, and/or the like.

In some implementations, the video system 110 may utilize an output of the trained machine learning model to cause the vehicle to perform a function, such as alert the driver, cause the vehicle to brake or steer in a particular direction in real time, provide driver data to another system (e.g., a system of a company that owns the vehicle as part of fleet management), provide driver data to an insurance company, provide driver data to a device of a parent of the teenage driver, provide some of the data to the driver for feedback for training the model (e.g., the driver could be alerted to a potentially relevant object and could be requested to give feedback as to whether the object is relevant), and/or the like. Over time, there may be particular objects that a specific driver has a difficult time in identifying, and the video system 110 may alert the driver when those objects are detected, which may prevent accidents. In some implementations, the machine learning model may be generic (e.g., for all drivers and all vehicles), may be specific for a set of drivers (e.g., drivers of a particular vehicle), or may be individual driver specific (e.g., so that each driver of a particular vehicle has a custom machine learning model).

In some implementations, a vehicle may not require detectors for all relevant objects identified in front facing video data because prior drivers in historical driver facing video data determined that particular objects are relevant (or filtered out irrelevant objects). If an object was previously identified as relevant, the vehicle may generate an alert to a driver of the vehicle when the object is encountered in the front facing video data. Furthermore, a severity of an object in the forward facing video data may be determined by adding a heatmap as a channel to a convolutional neural network (CNN) that identifies an importance of each object based on driver gaze. The heatmap may be added as channel to the CNN multiple times so that the CNN may understand an importance of an object. In some implementations, the trained machine learning model may determine what is important in forward facing video data and what can be ignored (e.g., what is not important for driving) in forward facing video data. For example, in a stop sign or a traffic signal may not be important in a particular situations and may be important in other situations. The video system 110 may report violations of stop signs and/or traffic signals associated with important situations.

In this way, the video system 110 determines road object importance based on forward facing and driver facing video data. For example, the video system 110 may go beyond simply understanding if a driver is distracted because the driver is not looking at a road. The video system 110 may utilize data associated with the driver attention, as captured by driver facing video data, to train a machine learning model to understand semantics of forward facing video data based on learning where the driver attention. The video system 110 may alert the driver that the driver is not looking at an important object, as opposed to simply not looking at the road, and may further understand (e.g., based on trained models that determine importance of objects based on previous driver gaze) the semantics of the forward facing video data by identifying which objects are relevant and which objects can safely be ignored. Thus, the video system 110 may conserve computing resources, networking resources, and/or other resources that would have otherwise been consumed by attempting and failing to manually label the video data, attempting and failing to train a computer vision model with the unlabeled video data, generating erroneous results with the computer vision model that is improperly trained, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
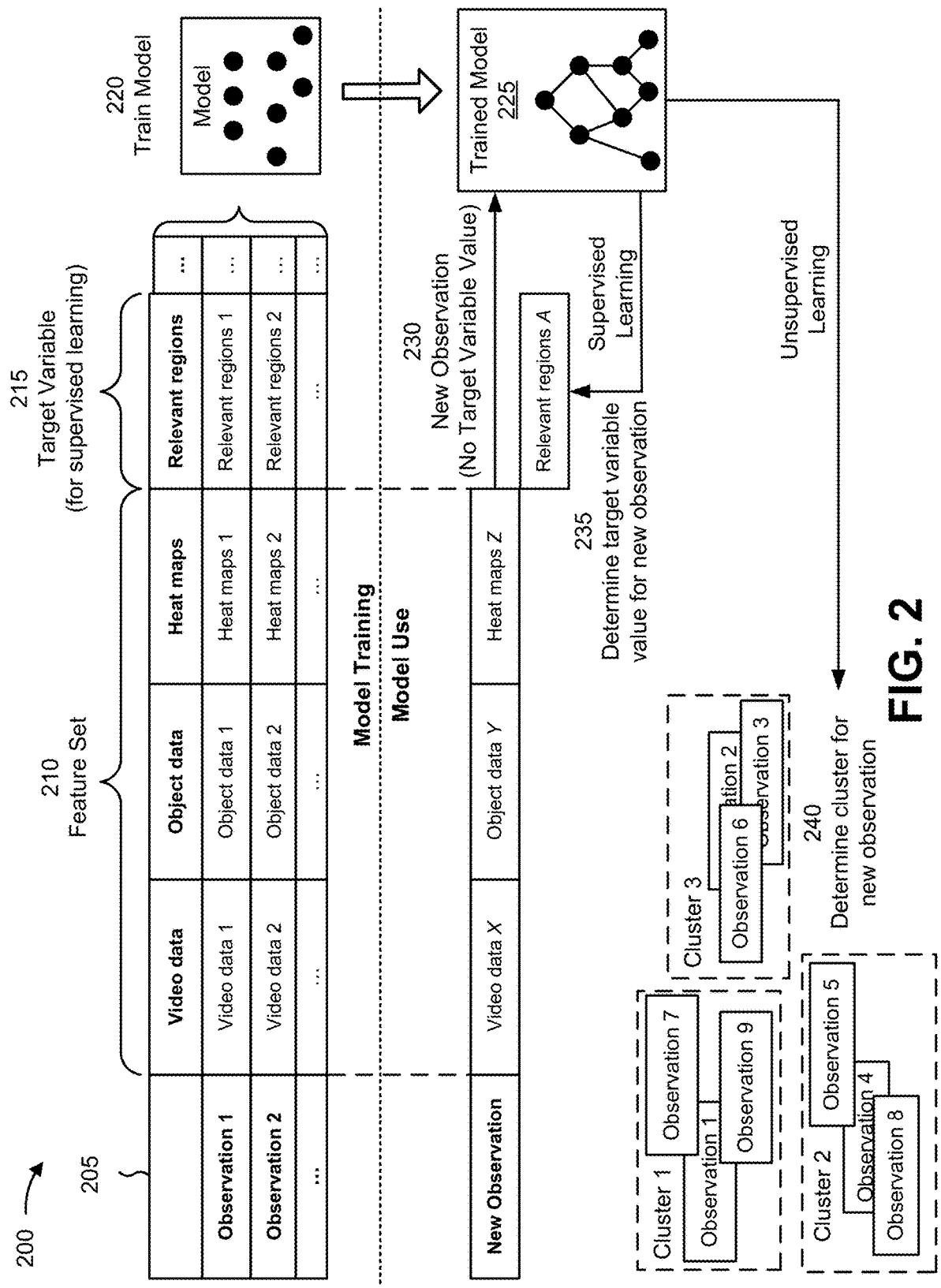
FIG. 2 is a diagram illustrating an example of training and using a machine learning model.

FIG. 2 is a diagram illustrating an example 200 of training and using a machine learning model for determining road object importance based on forward facing and driver facing video data. The machine learning model training and usage described herein may be performed using a machine learning system. The machine learning system may include or may be included in a computing device, a server, a cloud computing environment, and/or the like, such as the video system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the video system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of video data, a second feature of object data, a third feature of heat maps, and so on. As shown, for a first observation, the first feature may have a value of video data 1, the second feature may have a value of object data 1, the third feature may have a value of heat maps 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be entitled "relevant regions" and may include a value of relevant regions 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of video data X, a second feature of object data Y, a third feature of heat maps Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of relevant regions A for the target variable of the relevant regions for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a relevant region cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a non-relevant region cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine road object importance based on forward facing and driver facing video data. The machine learning system enables recognition and/or identification of tens, hundreds, thousands, or millions of features and/or feature values for tens, hundreds, thousands, or millions of observations, thereby increasing accuracy and consistency and reducing delay associated with determining road object importance based on forward facing and driver facing video data relative to requiring computing resources to be allocated for tens, hundreds, or thousands of operators to manually determine road object importance based on forward facing and driver facing video data.

As indicated above, FIG. 2 is provided as an example. Other examples may differ from what is described in connection with FIG. 2.

Figure 3:
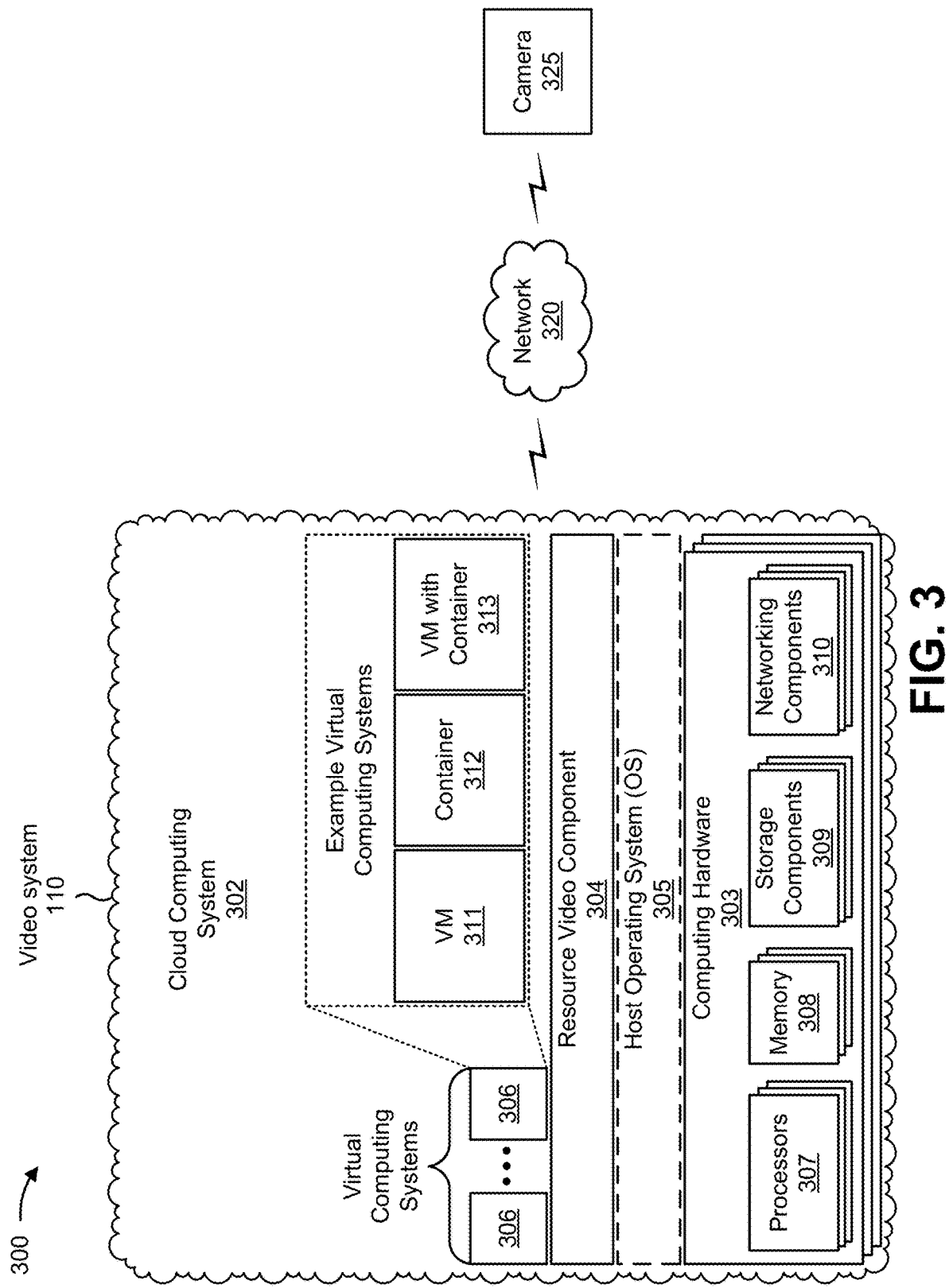
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 110, which may include one or more elements of and/or may execute within a cloud computing system 302. The cloud computing system 302 may include one or more elements 303-313, as described in more detail below. As further shown in FIG. 3, the environment 300 may include the camera 325 (e.g., the driver facing camera 104 and/or the forward facing camera 105) and/or a network 320. Devices and/or elements of the environment 300 may interconnect via wired connections and/or wireless connections.

The camera 325 may include one or more devices capable of receiving, generating, storing, processing, providing, and/or routing information, as described elsewhere herein. The camera 325 may include a communication device and/or a computing device. For example, the camera 325 may include an optical instrument that captures videos (e.g., images and audio). The camera 325 may feed real-time video directly to a screen or a computing device for immediate observation, may record the captured video (e.g., images and audio) to a storage device for archiving or further processing, and/or the like. In some implementations, the camera 325 may include a driver facing camera (e.g., dashcam) of a vehicle, a forward facing camera of a vehicle, and/or the like.

The cloud computing system 302 includes computing hardware 303, a resource video component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 110 may include one or more elements 303-313 of the cloud computing system 302, may execute within the cloud computing system 302, and/or may be hosted within the cloud computing system 302, in some implementations, the video system 110 may not be cloud-based (e.g., may be implemented outside of a cloud computing system) or may be partially cloud-based. For example, the video system 110 may include one or more devices that are not part of the cloud computing system 302, such as a device 400 of FIG. 4, which may include a standalone server or another type of computing device. The video system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
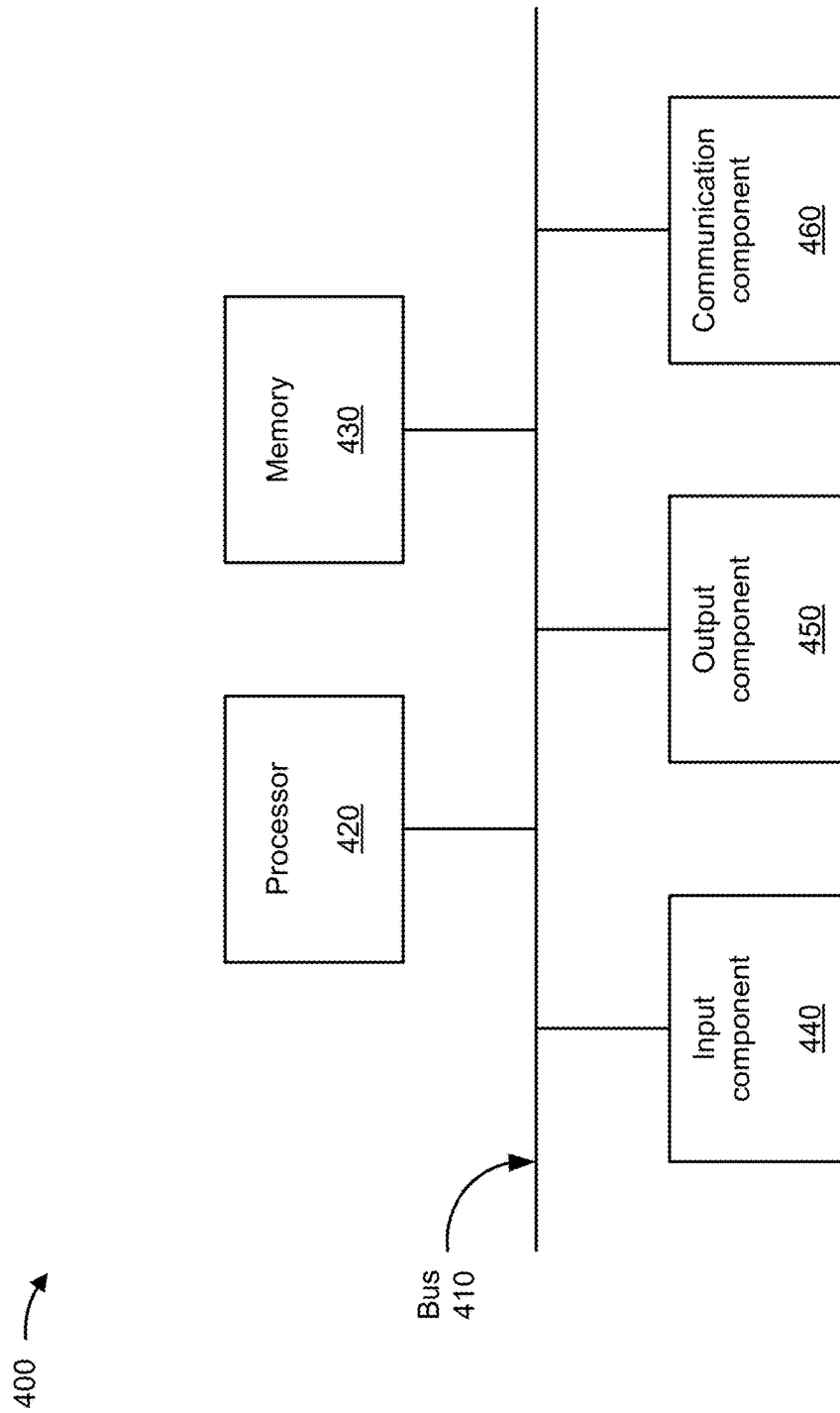
FIG. 4 is a diagram of example components of one or more devices of FIG. 3.

FIG. 4 is a diagram of example components of a device 400, which may correspond to the driver facing camera 104, the forward facing camera 105, and/or the video system 110. In some implementations, the driver facing camera 104, the forward facing camera 105, and/or the video system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
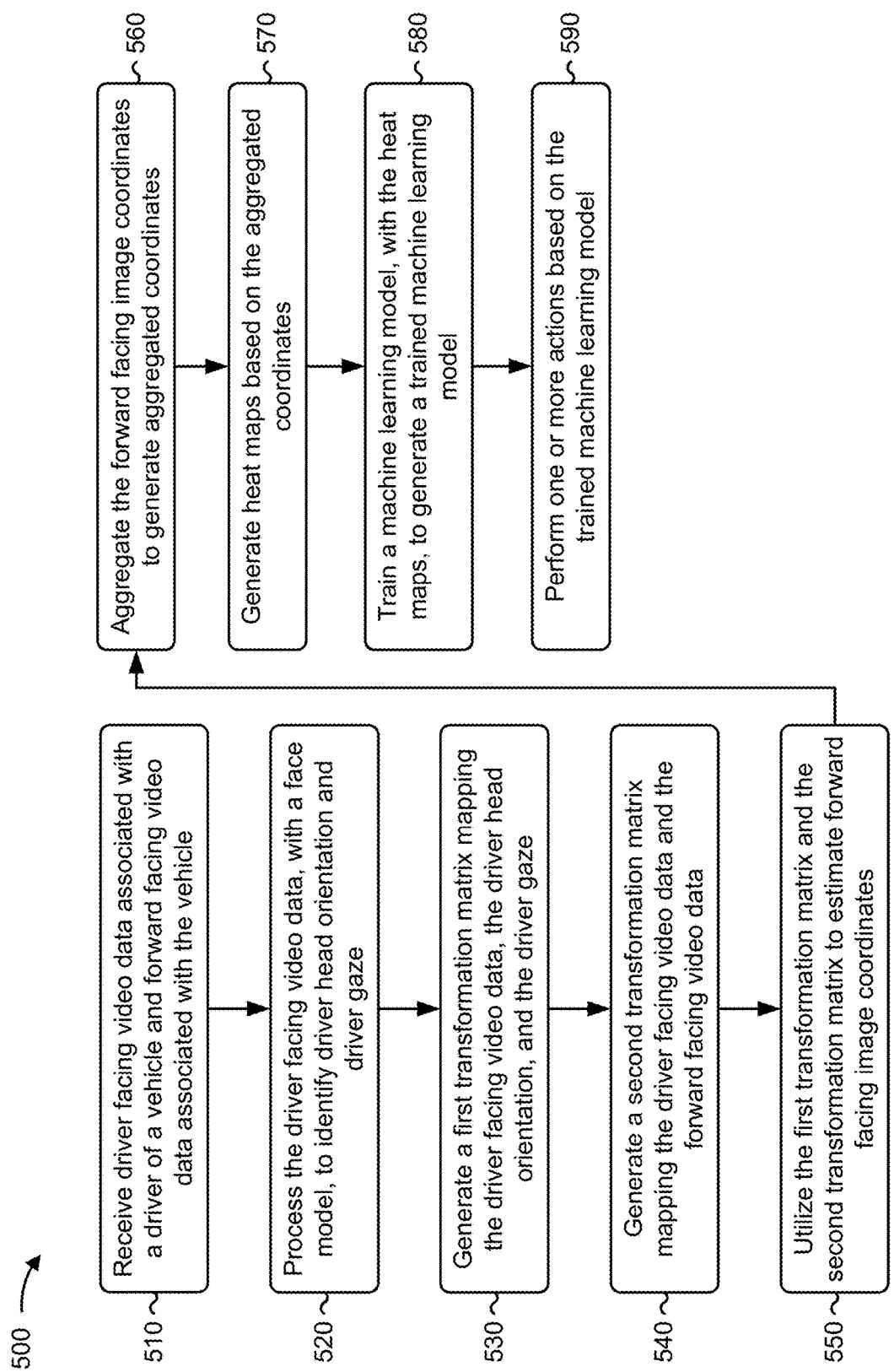
FIGS. 5 and 6 are flowcharts of example processes for determining road object importance based on forward facing and driver facing video data.

FIG. 5 depicts a flowchart of an example process 500 for determining road object importance based on forward facing and driver facing video data. In some implementations, one or more process blocks of FIG. 5 may be performed by a device (e.g., the video system 110). In some implementations, one or more process blocks of FIG. 5 may be performed by another device or a group of devices separate from or including the device, such as a camera (e.g., the driver facing camera 104 and/or the forward facing camera 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving driver facing video data associated with a driver of a vehicle and forward facing video data associated with the vehicle (block 510). For example, the device may receive driver facing video data associated with a driver of a vehicle and forward facing video data associated with the vehicle, as described above. In some implementations, the driver facing video data includes video data identifying the driver of the vehicle over a time period associated with operation of the vehicle. In some implementations, the forward facing video data includes video data identifying objects appearing in front of the vehicle over a time period associated with operation of the vehicle.

As further shown in FIG. 5, process 500 may include processing the driver facing video data, with a face model, to identify driver head orientation and driver gaze (block 520). For example, the device may process the driver facing video data, with a face model, to identify driver head orientation and driver gaze, as described above. In some implementations, processing the driver facing video data, with the face model, to identify driver head orientation and driver gaze includes processing the driver facing video data, with the face model, to determine a distance of a driver head from a driver facing camera that captures the driver facing video data.

As further shown in FIG. 5, process 500 may include generating a first transformation matrix mapping the driver facing video data, the driver head orientation, and the driver gaze (block 530). For example, the device may generate a first transformation matrix mapping the driver facing video data, the driver head orientation, and the driver gaze, as described above. In some implementations, generating the first transformation matrix mapping the driver facing video data, the driver head orientation, and the driver gaze includes utilizing a direction cosine matrix to generate the first transformation matrix mapping the driver facing video data, the driver head orientation, and the driver gaze. In some implementations, generating the first transformation matrix mapping the driver facing video data, the driver head orientation, and the driver gaze includes utilizing a face mesh model, an eye key points extraction model, and a perspective-n-points estimation model to generate the first transformation matrix mapping the driver facing video data, the driver head orientation, and the driver gaze.

As further shown in FIG. 5, process 500 may include generating a second transformation matrix mapping the driver facing video data and the forward facing video data (block 540). For example, the device may generate a second transformation matrix mapping the driver facing video data and the forward facing video data, as described above. In some implementations, generating the second transformation matrix mapping the driver facing video data and the forward facing video data includes generating the second transformation matrix based on a first mechanical construction and a first direction of a driver facing camera that captures the driver facing video data and based on a second mechanical construction and a second direction of a forward facing camera that captures the forward facing video data.

As further shown in FIG. 5, process 500 may include utilizing the first transformation matrix and the second transformation matrix to estimate forward facing image coordinates (block 550). For example, the device may utilize the first transformation matrix and the second transformation matrix to estimate forward facing image coordinates observed by the driver, as described above.

As further shown in FIG. 5, process 500 may include aggregating the forward facing image coordinates to generate aggregated coordinates (block 560). For example, the device may aggregate the forward facing image coordinates to generate aggregated coordinates, as described above.

As further shown in FIG. 5, process 500 may include generating heat maps based on the aggregated coordinates (block 570). For example, the device may generate heat maps based on the aggregated coordinates, as described above.

As further shown in FIG. 5, process 500 may include training a machine learning model, with the heat maps, to generate a trained machine learning model (block 580). For example, the device may train a machine learning model, with the heat maps, to generate a trained machine learning model, as described above. In some implementations, the machine learning model is a deep learning model.

As further shown in FIG. 5, process 500 may include performing one or more actions based on the trained machine learning model (block 590). For example, the device may perform one or more actions based on the trained machine learning model, as described above. In some implementations, performing the one or more actions includes receiving new forward facing video data associated with another vehicle, and processing the new forward facing video data, with the trained machine learning model, to predict regions in the new forward facing video data that are semantically relevant to driving the other vehicle. In some implementations, performing the one or more actions includes one or more of predicting a region in new video data that is semantically relevant to driving, or determining that a driver of another vehicle is ignoring a relevant driving region. In some implementations, performing the one or more actions includes one or more of determining whether a road sign is relevant to another vehicle, determining whether a traffic signal is relevant to another vehicle, or identifying a potentially dangerous object for another vehicle.

In some implementations, process 500 includes determining gaze time periods associated with the forward facing image coordinates observed by the driver and provided in the aggregated coordinates, and generating the heat maps based on the gaze time periods and the aggregated coordinates.

In some implementations, process 500 includes receiving vehicle data identifying one or more of infrared images associated with the vehicle, multispectral images associated with the vehicle, a speed of the vehicle, a wheel turn angle of the vehicle, a turn signal of the vehicle, brake and thrust pedal levels of the vehicle, or an acceleration of the vehicle; and training the machine learning model, with the heat maps, to generate the trained machine learning model includes training the machine learning model, with the heat maps and the vehicle data, to generate the trained machine learning model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
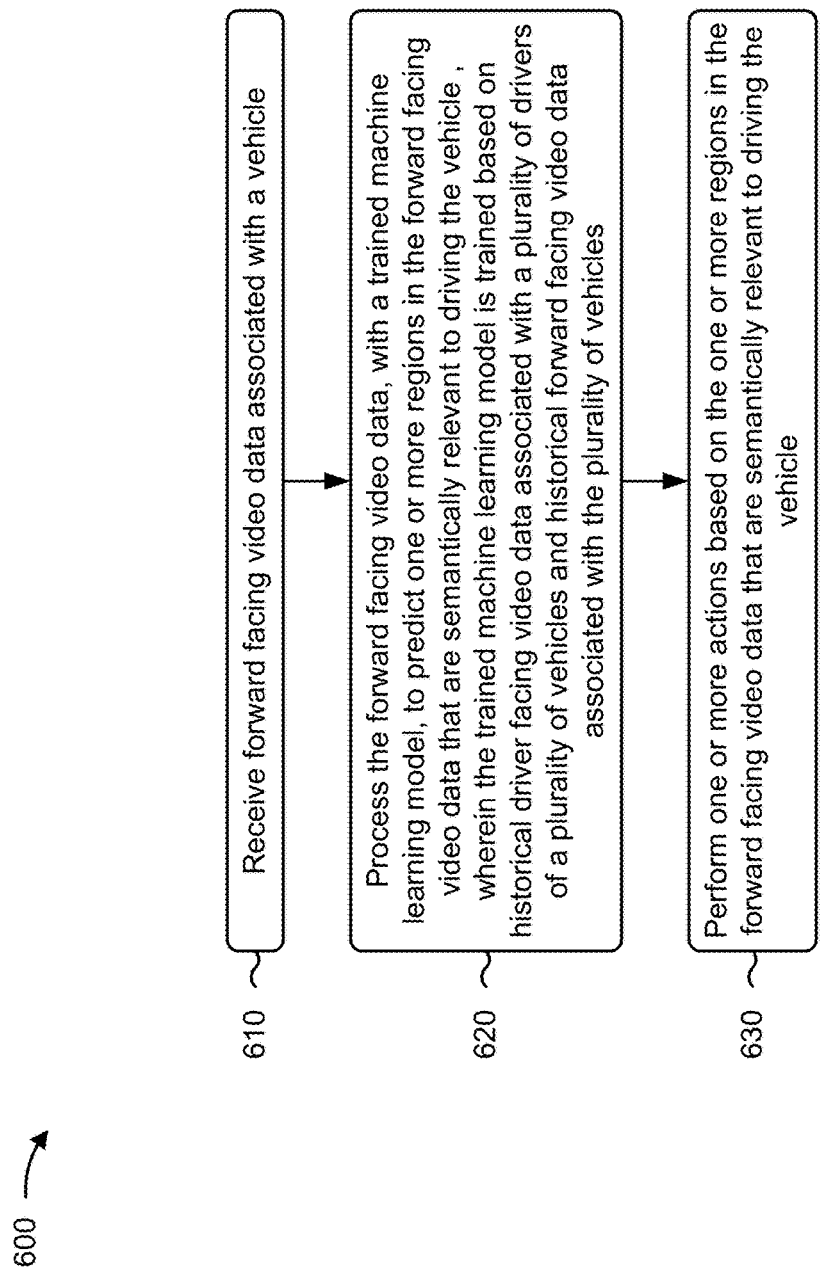

FIG. 6 is a flowchart of an example process 600 associated with determining road object importance based on forward facing and driver facing video data. In some implementations, one or more process blocks of FIG. 6 may be performed by a device (e.g., the video system 110). In some implementations, one or more process blocks of FIG. 6 may be performed by another device or a group of devices separate from or including the device, such as a camera (e.g., the driver facing camera 104 and/or the forward facing camera 105). Additionally, or alternatively, one or more process blocks of FIG. 6 may be performed by one or more components of the device 400, such as the processor 420, the memory 430, the input component 440, the output component 450, and/or the communication component 460.

As shown in FIG. 6, process 600 may include receiving forward facing video data associated with a vehicle (block 610). For example, the device may receive forward facing video data associated with a vehicle, as described above.

As further shown in FIG. 6, process 600 may include processing the forward facing video data, with a trained machine learning model, to predict one or more regions in the forward facing video data that are semantically relevant to driving the vehicle, wherein the trained machine learning model is trained based on historical driver facing video data associated with a plurality of drivers of a plurality of vehicles and historical forward facing video data associated with the plurality of vehicles (block 620). For example, the device may process the forward facing video data, with a trained machine learning model, to predict one or more regions in the forward facing video data that are semantically relevant to driving the vehicle, as described above. In some implementations, the trained machine learning model is trained based on historical driver facing video data associated with a plurality of drivers of a plurality of vehicles and historical forward facing video data associated with the plurality of vehicles.

As further shown in FIG. 6, process 600 may include performing one or more actions based on the one or more regions in the forward facing video data that are semantically relevant to driving the vehicle (block 630). For example, the device may perform one or more actions based on the one or more regions in the forward facing video data that are semantically relevant to driving the vehicle, as described above. In some implementations, performing the one or more actions includes determining that a driver of the vehicle is ignoring one of the one or more regions in the forward facing video data that are semantically relevant to driving the vehicle, and alerting the driver about the one of the one or more regions. In some implementations, performing the one or more actions includes determining that a road sign is one of the one or more regions in the forward facing video data that are semantically relevant to driving the vehicle, and alerting a driver of the vehicle about the road sign.

In some implementations, performing the one or more actions includes determining that a traffic signal is one of the one or more regions in the forward facing video data that are semantically relevant to driving the vehicle, and alerting a driver of the vehicle about the traffic signal. In some implementations, performing the one or more actions includes determining that a potentially dangerous object is one of the one or more regions in the forward facing video data that are semantically relevant to driving the vehicle, and alerting a driver of the vehicle about the potentially dangerous object. In some implementations, performing the one or more actions includes alerting a driver of the vehicle about the one or more regions in the forward facing video data that are semantically relevant to driving the vehicle.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, driver facing video data associated with a driver of a vehicle and forward facing video data associated with the vehicle;
    processing, by the device, the driver facing video data, with a face model, to identify driver head orientation and driver gaze;
    generating, by the device and utilizing a face mesh model, an eye key points extraction model, and a perspective-n-points estimation model, a first transformation matrix mapping the driver facing video data, the driver head orientation, and the driver gaze;
    generating, by the device, a second transformation matrix mapping the driver facing video data and the forward facing video data;
    utilizing, by the device, the first transformation matrix and the second transformation matrix to estimate forward facing image coordinates observed by the driver;
    aggregating, by the device, the forward facing image coordinates to generate aggregated coordinates;
    generating, by the device, heat maps based on the aggregated coordinates;
    training, by the device, a machine learning model, with the heat maps, to generate a trained machine learning model; and
    performing, by the device, one or more actions based on the trained machine learning model.

2. The method of claim 1, wherein the driver facing video data includes video data identifying the driver of the vehicle over a time period associated with operation of the vehicle.

3. The method of claim 1, wherein the forward facing video data includes video data identifying objects appearing in front of the vehicle over a time period associated with operation of the vehicle.

4. The method of claim 1, wherein processing the driver facing video data, with the face model, to identify driver head orientation and driver gaze comprises:
    processing the driver facing video data, with the face model, to determine a distance of a driver head from a driver facing camera that captures the driver facing video data.

5. The method of claim 1, wherein generating the first transformation matrix mapping the driver facing video data, the driver head orientation, and the driver gaze comprises:
    utilizing a direction cosine matrix to generate the first transformation matrix mapping the driver facing video data, the driver head orientation, and the driver gaze.

6. The method of claim 1, wherein generating the second transformation matrix mapping the driver facing video data and the forward facing video data comprises:
    generating the second transformation matrix based on a first mechanical construction and a first direction of a driver facing camera that captures the driver facing video data and based on a second mechanical construction and a second direction of a forward facing camera that captures the forward facing video data.

7. A device, comprising:
    one or more processors configured to:
        receive driver facing video data associated with a driver of a vehicle and forward facing video data associated with the vehicle;
        process the driver facing video data, with a face model, to identify driver head orientation and driver gaze;
        utilize a face mesh model, an eye key points extraction model, and a perspective-n-points estimation model to generate a first transformation matrix mapping the driver facing video data, the driver head orientation, and the driver gaze;

generate a second transformation matrix mapping the driver facing video data and the forward facing video data;
utilize the first transformation matrix and the second transformation matrix to estimate forward facing image coordinates observed by the driver;
aggregate the forward facing image coordinates to generate aggregated coordinates;
generate heat maps based on the aggregated coordinates,
  wherein the heat maps are associated with regions of the forward facing video data that are relevant to driving;
train a machine learning model, with the heat maps, to generate a trained machine learning model; and
perform one or more actions based on the trained machine learning model.

8. The device of claim 7, wherein the one or more processors, to generate the heat maps based on the aggregated coordinates, are configured to:
determine gaze time periods associated with the forward facing image coordinates observed by the driver and provided in the aggregated coordinates; and
generate the heat maps based on the gaze time periods and the aggregated coordinates.

9. The device of claim 7, wherein the machine learning model is a deep learning model.

10. The device of claim 7, wherein the one or more processors are further configured to:
receive vehicle data identifying one or more of infrared images associated with the vehicle, multispectral images associated with the vehicle, a speed of the vehicle, a wheel turn angle of the vehicle, a turn signal of the vehicle, brake and thrust pedal levels of the vehicle, or an acceleration of the vehicle,
  wherein the one or more processors, to train the machine learning model, with the heat maps, to generate the trained machine learning model, are configured to:
    train the machine learning model, with the heat maps and the vehicle data, to generate the trained machine learning model.

11. The device of claim 7, wherein the one or more processors, to perform the one or more actions, are configured to:
receive new forward facing video data associated with another vehicle; and
process the new forward facing video data, with the trained machine learning model, to predict regions in the new forward facing video data that are semantically relevant to driving the other vehicle.

12. The device of claim 7, wherein the one or more processors, to perform the one or more actions, are configured to one or more of:
predict a region in new video data that is semantically relevant to driving; or
determine that a driver of another vehicle is ignoring a relevant driving region.

13. The device of claim 7, wherein the one or more processors, to perform the one or more actions, are configured to one or more of:
determine whether a road sign is relevant to another vehicle;
determine whether a traffic signal is relevant to another vehicle; or
identify a potentially dangerous object for another vehicle.

14. A non-transitory computer-readable medium storing a set of instructions, the set of instructions comprising:
one or more instructions that, when executed by one or more processors of a device, cause the device to:
receive driver facing video data associated with a driver of a vehicle and forward facing video data associated with the vehicle;
process the driver facing video data, with a face model, to identify driver head orientation and driver gaze;
utilize a face mesh model, an eye key points extraction model, and a perspective-n-points estimation model to generate a first transformation matrix mapping the driver facing video data, the driver head orientation, and the driver gaze;
generate a second transformation matrix mapping the driver facing video data and the forward facing video data;
utilize the first transformation matrix and the second transformation matrix to estimate forward facing image coordinates observed by the driver;
aggregate the forward facing image coordinates to generate aggregated coordinates;
generate heat maps based on the aggregated coordinates,
  wherein the heat maps are associated with regions of the forward facing video data that are relevant to driving;
train a machine learning model, with the heat maps, to generate a trained machine learning model; and
perform one or more actions based on the trained machine learning model.

15. The non-transitory computer-readable medium of claim 14, wherein the one or more instructions, that cause the device to generate the heat maps based on the aggregated coordinates, cause the device to:
determine gaze time periods associated with the forward facing image coordinates observed by the driver and provided in the aggregated coordinates; and
generate the heat maps based on the gaze time periods and the aggregated coordinates.

16. The non-transitory computer-readable medium of claim 14, wherein the machine learning model is a deep learning model.

17. The non-transitory computer-readable medium of claim 14, wherein the one or more instructions, when executed by the one or more processors, further cause the device to:
receive vehicle data identifying one or more of infrared images associated with the vehicle, multispectral images associated with the vehicle, a speed of the vehicle, a wheel turn angle of the vehicle, a turn signal of the vehicle, brake and thrust pedal levels of the vehicle, or an acceleration of the vehicle,
  wherein the one or more processors, to train the machine learning model, with the heat maps, to generate the trained machine learning model, are configured to:
    train the machine learning model, with the heat maps and the vehicle data, to generate the trained machine learning model.

18. The non-transitory computer-readable medium of claim 14, wherein the one or more instructions, to perform the one or more actions, cause the device to:
receive new forward facing video data associated with another vehicle; and
process the new forward facing video data, with the trained machine learning model, to predict regions in the new forward facing video data that are semantically relevant to driving the other vehicle.

19. The non-transitory computer-readable medium of claim 14, wherein the one or more instructions, to perform the one or more actions, cause the device to:
predict a region in new video data that is semantically relevant to driving; or
determine that a driver of another vehicle is ignoring a relevant driving region.

20. The non-transitory computer-readable medium of claim 14, wherein the one or more instructions, to perform the one or more actions, cause the device to:
determine whether a road sign is relevant to another vehicle;
determine whether a traffic signal is relevant to another vehicle; or
identify a potentially dangerous object for another vehicle.

* * * * *